(12) United States Patent
Jakoby et al.

(10) Patent No.: US 6,752,691 B1
(45) Date of Patent: Jun. 22, 2004

(54) DEVICE FOR SMOOTHING GEAR WHEELS

(75) Inventors: Herbert Jakoby, Kirkel (DE);
Matthias Hopfeld, Kirkel (DE)

(73) Assignee: MiniTec for better gears GmbH, St. Ingbert (DE)

( * ) Notice: Subject to any disclaimer, the term of this patent is extended or adjusted under 35 U.S.C. 154(b) by 0 days.

(21) Appl. No.: 10/353,884

(22) Filed: Jan. 29, 2003

(51) Int. Cl.[7] .................................................. B24B 1/00
(52) U.S. Cl. ................ 451/6; 451/5; 451/47; 451/253; 451/336; 451/339; 451/900
(58) Field of Search ........................... 451/5, 6, 11, 47, 451/218, 219, 242, 253, 332, 336, 339, 900, 8, 9

(56) References Cited

U.S. PATENT DOCUMENTS

| 3,699,724 A | * | 10/1972 | Ellis et al. |
| 4,422,265 A | * | 12/1983 | Branston |
| 4,856,232 A | * | 8/1989 | Shirai |
| 5,174,070 A | * | 12/1992 | Losch et al. |
| 6,357,994 B1 | * | 3/2002 | St. Onge ..................... 414/738 |
| 6,520,895 B2 | * | 2/2003 | Senga et al. ................... 483/1 |

* cited by examiner

Primary Examiner—Eileen P. Morgan
(74) Attorney, Agent, or Firm—Friedrich Kueffner

(57) ABSTRACT

A device for smoothing gear wheels includes a loading station for supplying the gear wheels, a smoothing station for smoothing the flanks of the teeth, an inspection station for inspecting the degree of smoothing, and an unloading station for carrying away the processed gear wheels, wherein the stations are arranged around a rotary transport device for conveying the gear wheels from station to station.

16 Claims, 5 Drawing Sheets

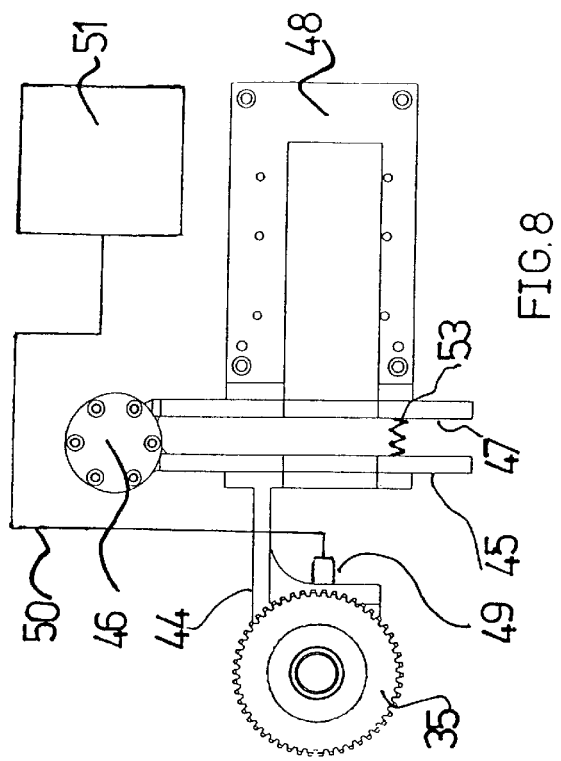
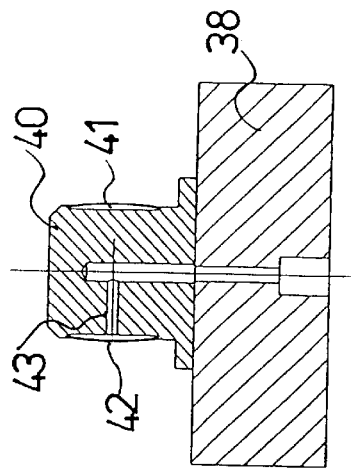
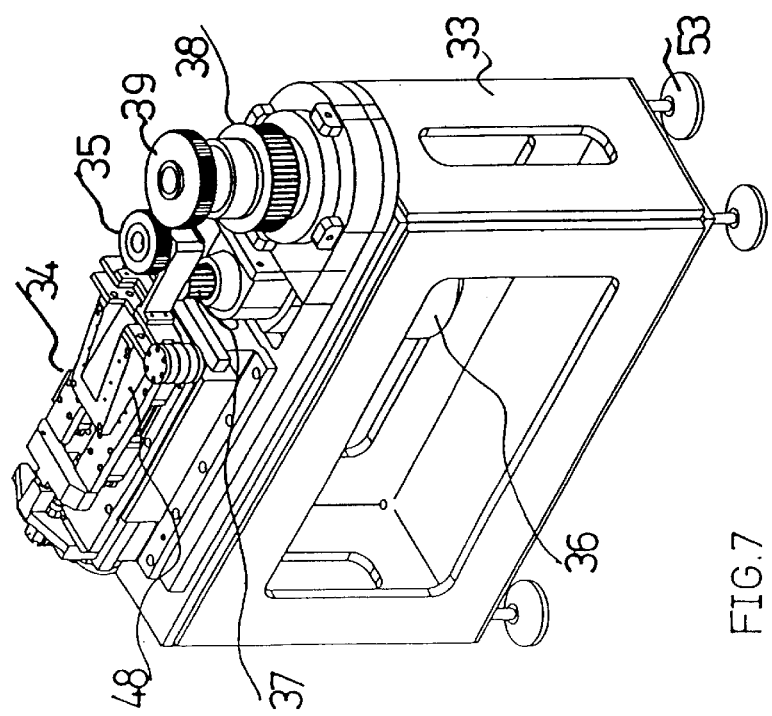

DEVICE FOR SMOOTHING GEAR WHEELS

BACKGROUND OF THE INVENTION

1. Field of the Invention

The present invention relates to a device for smoothing gear wheels.

2. Description of the Related Art

In the production of high-quality gear wheels, it is necessary to perform a final smoothing operation, during the course of which the roughness of the surfaces of the teeth, especially the roughness of the tooth flanks, is eliminated. This measure serves, first, to reduce the noise generated by gear transmissions and, second, to reduce wear.

SUMMARY OF THE INVENTION

The invention is based on the task of creating a new device which, while occupying only a modest amount of space, makes it possible to smooth gear wheels more efficiently than is possible according to the state of the art.

In accordance with the invention, the device for smoothing gear wheels which accomplishes this task by a loading station for supplying the gear wheels, by a smoothing station for smoothing the flanks of the teeth, by an inspection station for inspecting the degree of smoothing, and by an unloading station for carrying away the processed gear wheels, wherein the stations listed above are arranged around a rotary transport device, which conveys the gear wheels from station to station.

According to the invention, a rotary transport device advantageously integrates a smoothing station and an inspection station into a single system, which delivers smoothed gear wheels which have been checked to ensure that they have been smoothed sufficiently. In particular, this inventive solution makes it possible for gear wheels which have not been smoothed sufficiently to be left in the machining process and returned very efficiently to the smoothing station, for which purpose a control unit is provided, which, as a function of the results of the inspection, causes a gear wheel to be delivered to the unloading station or returned to the smoothing station.

The invention is based on the finding that reprocessing is often required in the course of smoothing operations and that it is therefore worth the effort to combine a smoothing station with an inspection station by using a rotary transport device to obtain a single, compact system.

In the preferred embodiment of the invention, the stations are arranged in the sequence indicated. In a different embodiment, the inspection station could be installed between the loading station and the smoothing station. The gear wheels which do not require smoothing would then pass through the other stations without being processed.

In the preferred embodiment of the invention, the smoothing station is followed by a washing station, where the smoothing aids are cleaned off the gear wheels. This washing station is especially necessary when these smoothing aids, such as drilling fluid used for smoothing, would falsify the results of the subsequent inspection in the inspection station.

This will be the case, for example, when, as in the preferred embodiment of the invention, the inspection station for inspecting the degree of smoothing functions on the basis of a noise analysis. In this noise analysis, for example, the noise which is produced when the wheel to be tested drives a testing wheel in the inspection station is evaluated.

In addition to a noise analysis, the inspection device could also be based on the idea of a geometric inspection with mechanical measuring sensors or photo sensors, which scan the teeth of the gear wheel being inspected. In particular, a geometric inspection could be conducted by the single-flank and two-flank contact rolling test method.

It is advisable to provide devices for acoustically separate the inspection station from the other stations. To separate the inspection station with respect to structure-borne sound, it would be possible, for example, to use rubber bearings or other types of damping elements to support the station.

The smoothing device preferably has smoothing gear wheels which rotate around a vertical axis.

In accordance with this design of the smoothing device, the rotary transport device is advantageously provided with a rotating element, which can hold the gear wheels and rotate around a vertical axis.

In the preferred embodiment of the invention, the rotating element comprises gear wheel holders distributed around its circumference, the number of holders corresponding to the number of stations, where preferably the angular distance between the gear wheel holders is constant. The gear wheel holders for holding the gear wheels are provided with the rotational axis of the gear wheels in the vertical direction. It is advantageous to use radially projecting grippers as gear wheel holders. It is advisable for the rotating element which delivers the gear wheels to the stations and accepts them back from the stations to be capable of vertical displacement as a whole. With a design of this type, it is possible for a gear wheel to be supplied simultaneously to each station as the rotating element is lowered or for a gear wheel to be removed from each station as the rotating element is raised in each rotational position in which the grippers are aligned with the stations in question.

It is advisable for the inspection station to have a pneumatic mandrel for receiving the gear wheel to be inspected, the diameter of the mandrel being smaller than the diameter of the axial bore in the gear wheel to be inspected, but which mandrel can be expanded by hydraulic pressure to such an extent that it can drive the gear wheel to be tested when it is engaged with the testing gear wheel.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

In the drawing:

FIG. 7 is a perspective view of an inspection station used in the device of FIGS. 1 and 2;

FIG. 8 is a detail view of the inspection station of FIG. 7; and

FIG. 9 is another detail view of the inspection station of FIG. 7.

DETAILED DESCRIPTION OF THE INVENTION

Figure 1:
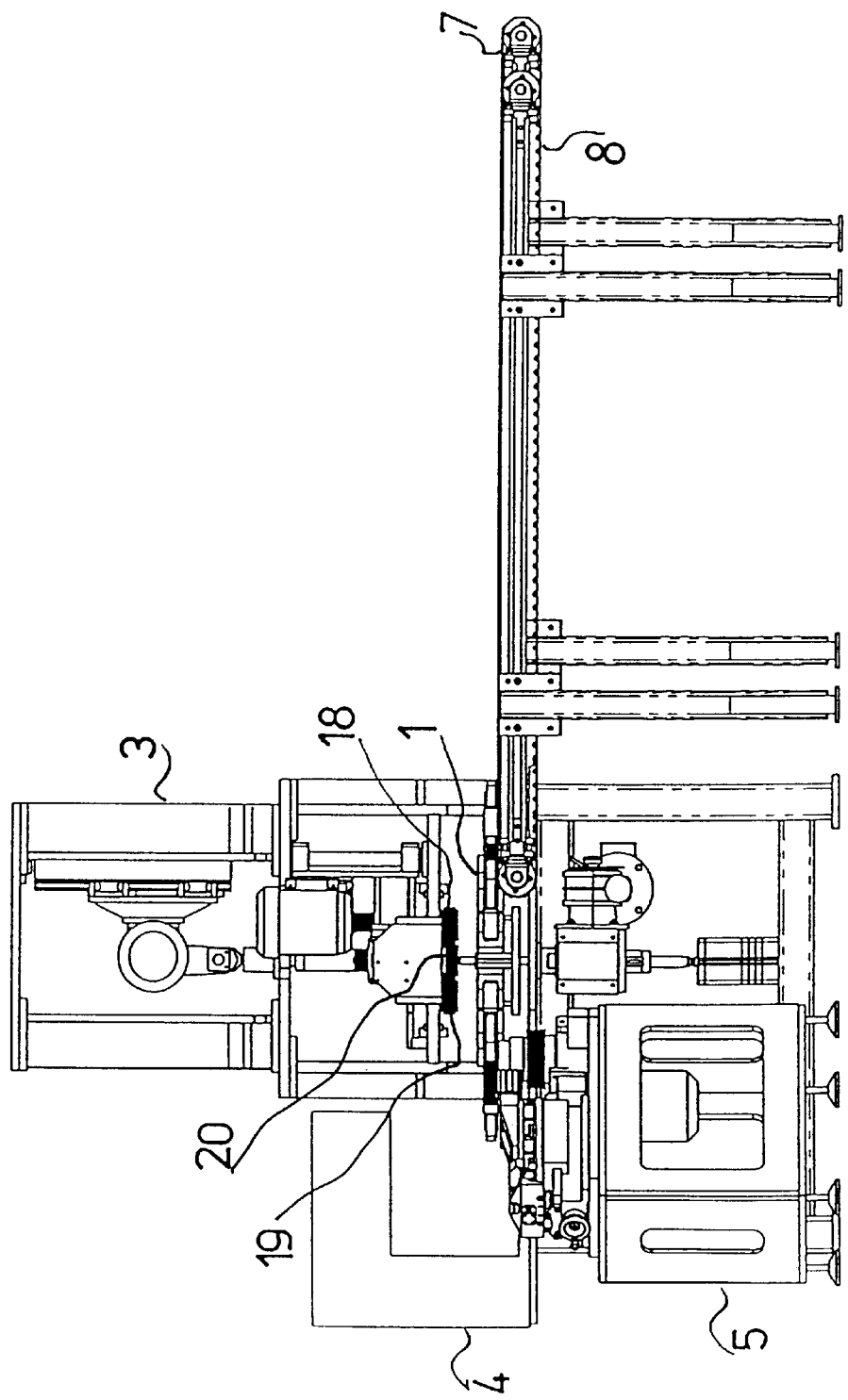
FIG. 1 is a side view of a device according to the invention.

A loading station 2, a smoothing station 3, a washing station 4, an inspection station 5, and an unloading station 6 are arranged around a rotary transport unit 1.

A conveyor belt 7 for supplying gear wheels 39 terminates at the loading station 2. A conveyor belt 8, which is used to carry the gear wheels away, terminates at the unloading station 6.

In the washing station 4, spray devices (not shown) are used to rinse off the gear wheels, to which the drilling emulsion or oil applied in the smoothing station still adheres.

Figure 6:
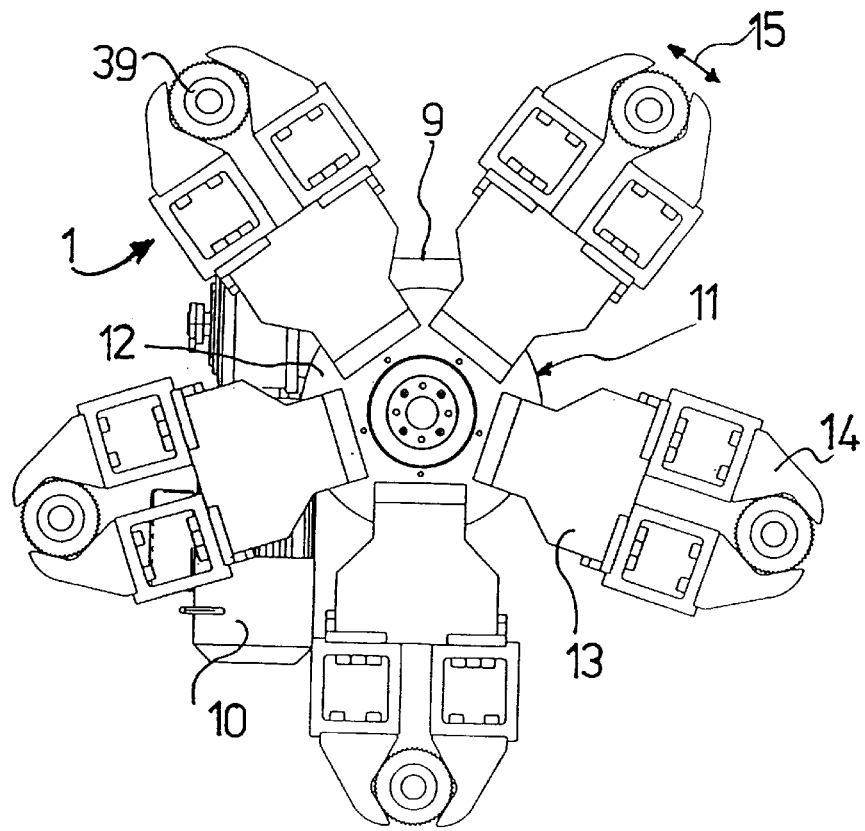
FIG. 6 is a top view of a rotary transport unit used in the device of FIGS. 1 and 2.

As is especially clear in FIG. 6, the rotary transport device has a base part 9 with a drive motor 10. On the base part, a rotating element 11, which can be driven by the drive motor 10, is supported so that it can rotate around a vertical axis. The rotating element 11 has five grippers 13, projecting radially out from a central support disk 12, each gripper being provided with two gripper jaws 14, which can be moved pneumatically in the tangential direction as shown by the arrow 15. The angular distance between the grippers 13 is constant. The stations 2–6 listed above are arranged around the rotary transport unit 1 with the same angular distances between them.

The base part 9 of the rotary transport unit 1 is also provided with a lifting device (not shown), by means of which the rotating element 11 can be raised and lowered as a whole.

Figure 4:
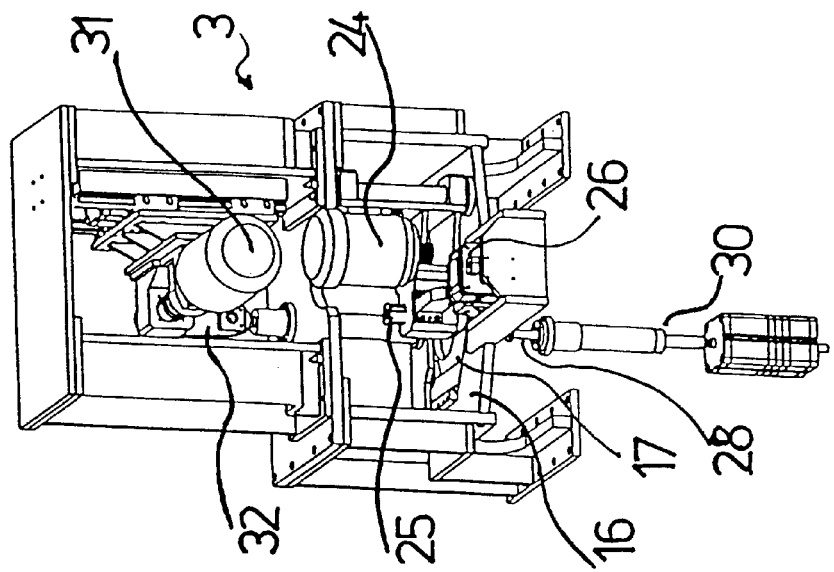
FIG. 4 is a perspective view of the smoothing station of FIG. 3.
Figure 3:
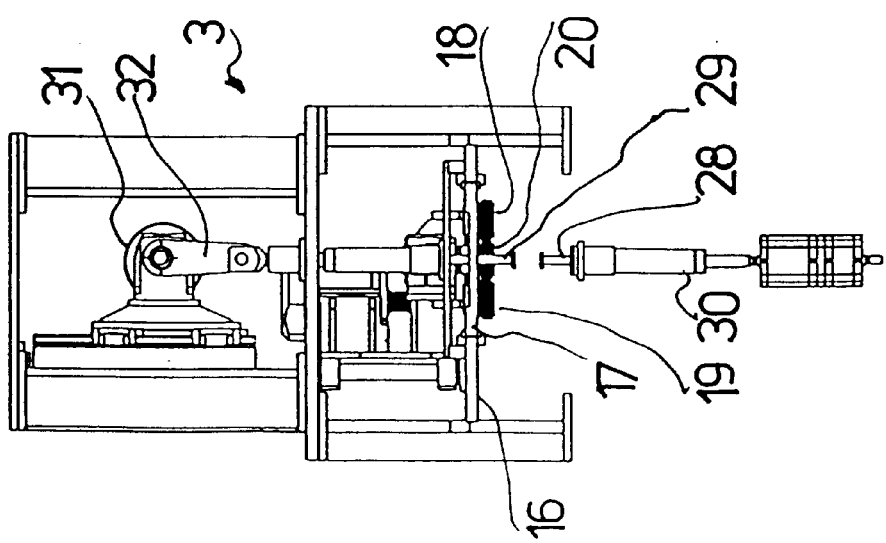
FIG. 3. is a top view of a smoothing station used in the device of FIGS. 1 and 2.
Figure 5:
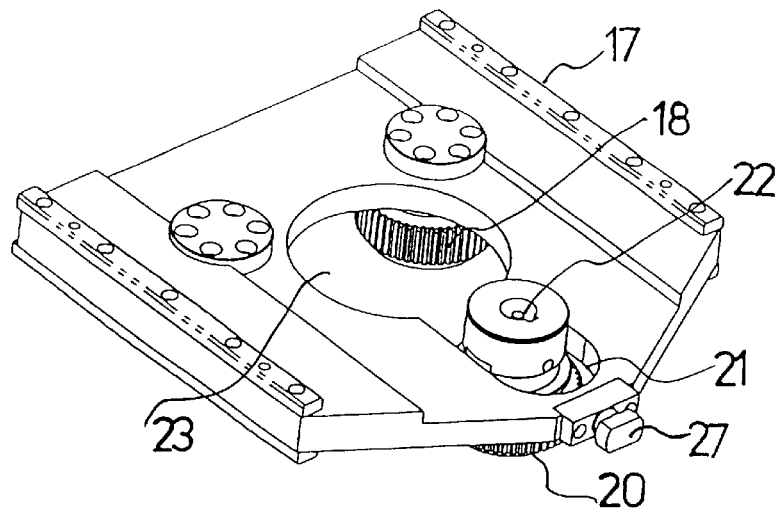
FIG. 5 is a detail view of the smoothing station of FIGS. 3 and 4.

Reference is now made to FIGS. 3–5, which show the smoothing station 3 in detail.

An insertion slide 17 is installed in a holder housing 16 in the smoothing station 3. The slide 17 shown separately in FIG. 5 has three smoothing gear wheels 18–20 arranged at points corresponding to the corners of a triangle. The smoothing gear wheels 18 and 19 are supported on gimbals.

The smoothing gear wheel 20 is able to move with respect to the slide 17 in a groove 21 in a direction perpendicular to its rotational axis and has a connecting device 22 for a rotary drive. As can be seen in FIG. 5, the groove 21 opens out into a circular opening 23 made in the slide 17.

A drive motor 24 is used to drive the smoothing gear wheel 20. This motor is connected to a drive shaft 25 by a toothed belt (not shown), and the shaft can be brought into working connection with the smoothing gear wheel 20 by the connecting device 22.

The slide 17 can be shifted by a pneumatic or hydraulic actuator 26 in a direction perpendicular to the rotational axis of the smoothing gear wheel 20; the actuator acts on an undercut stud 27 on the slide 17 and thus presses the smoothing gear wheels 18–20 against the gear wheel to be smoothed.

Reference numbers 28 and 29 in FIGS. 3 and 4 designate opposing gripping plungers, between which a gear wheel to be smoothed can be held and which have a centering cone (not shown), which fits into the axial bore in the gear wheel. The gripping plunger 28 can be raised and lowered by means of a pneumatic lifting device 30, as a result of which a gear wheel to be processed can be held between the gripping plungers 28 and 29 and moved into position between the smoothing gear wheels 18–20.

A device for producing vertical oscillations acts on the upper gripping plunger 29; this device comprises a drive motor 31 and a connecting rod 32, attached eccentrically to the rotational axis of the drive motor 31.

Reference is now made to FIGS. 7–9, where reference number 33 designates the base part of an inspection station resting on support feet 53. A slide 34 with a testing gear wheel 35 is mounted on the base part 33.

A drive motor 36 is also mounted on the base part. This motor is in working connection with a toothed drive shaft 38 by way of a toothed drive shaft 37 and a toothed belt (now shown). The drive shaft 38 serves to rotate a gear wheel to be tested 39, which can be set down axially onto this shaft.

As can be seen in FIG. 9, the gear wheel 39 to be tested can be set down onto a mandrel 40 of the shaft 38. The mandrel 40 has a ring-shaped space 41, which is covered externally by an elastically stretchable jacket ring 42. A channel 43 for the introduction of a hydraulic fluid opens into the ring-shaped space 41.

As can be seen in FIG. 8, the testing gear wheel 35 is supported rotatable on a holding yoke 44, the holding yoke 44 being connected to a sidepiece 45, which is pivotally connected to another sidepiece 47, opposite the sidepiece 45, by a joint 46. The sidepieces 45, 47 are connected elastically to each other by a spring 53.

The sidepiece 47 is attached to a wedge-shaped connecting piece 48, which is mounted in turn on the slide 34.

The yoke 44 is connected to a noise sensor 49, the electrical signals of which are sent over a line 50 to a noise analyzer 51, indicated schematically in FIG. 8.

It is apparent that the device described above will include a switching unit to control the movement of the moving parts.

The way in which the system works is described below.

Figure 2:
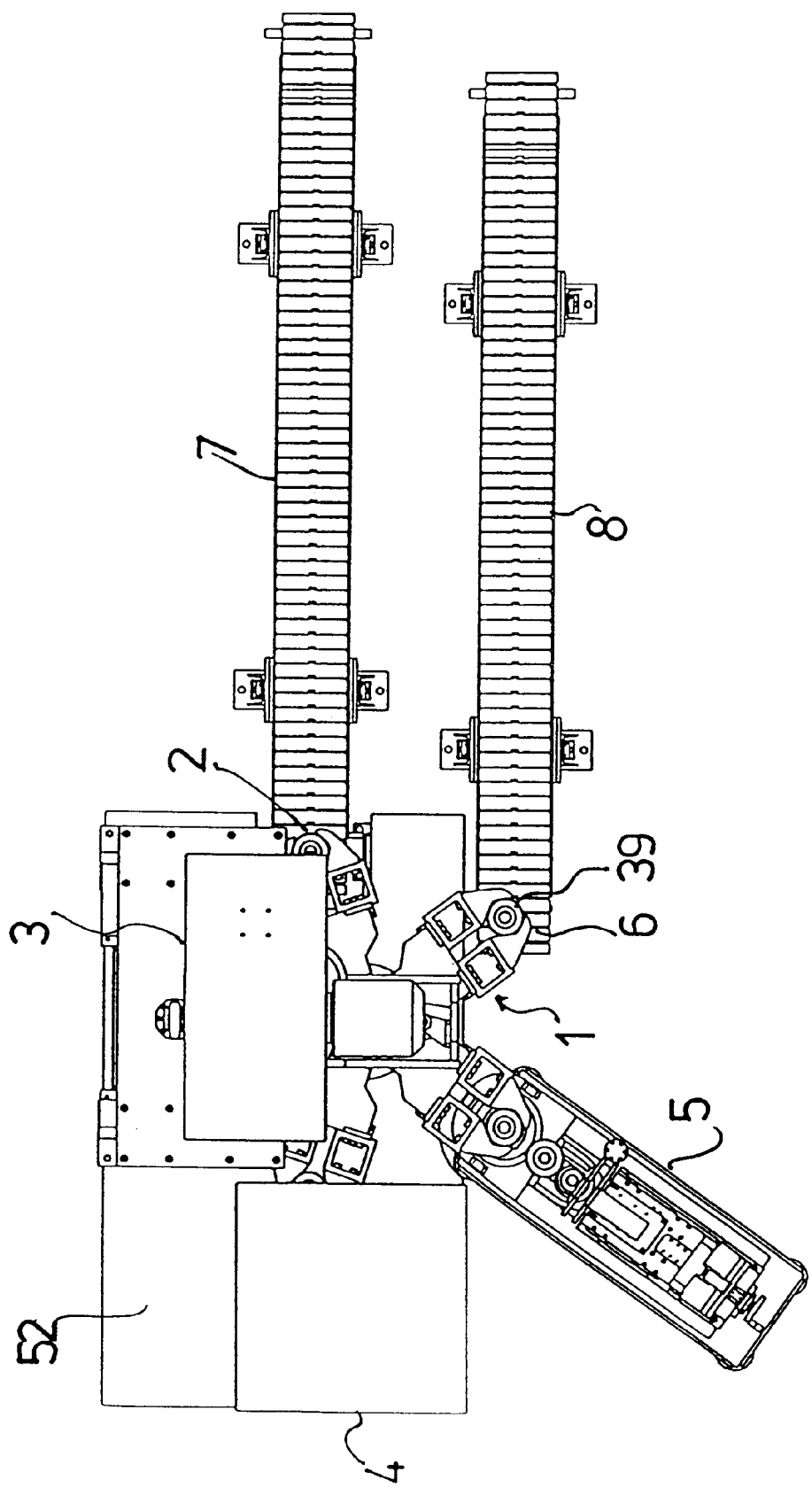
FIG. 2 is a top view of the device of FIG. 1.

Gear wheels 39 supplied on the conveyor belt 7 come up against a stop in the loading station 2 and thus arrive in a transfer position. In this position, shown in FIG. 2, the gripper 13 in question picks up the gear wheel. The above-mentioned control unit now turns the rotating element 11 around an angle of 72°. The gear wheel thus arrives in a position between the gripping plungers 28, 29. The lifting device provided on the base part of the rotary transport device 1 lowers the rotating element 11 as a whole, so that the gear wheel is seated on the lower gripping plunger 28, the conical projection of which ensures that the gear wheel is properly centered. Then the gripping plunger raises the gear wheel until it makes contact with the gripping plunger 29. As it is being held between the gripping plungers 28 and 29, the gear wheel is then conveyed onward in the vertical direction by the pneumatic lifting device 30 until it reaches a position between the smoothing gear wheels 18–20. By means of the actuator 26, which shifts the slide 17, the gear wheels 18–20 are brought into engagement with the gear wheel to be smoothed, and the gear wheel 20, which is driven by the drive motor 24, the toothed belt (not shown), and the shaft 25, causes the gear wheel to be smoothed and the other smoothing gear wheels 18 and 19 to rotate. The pneumatic actuator 26 provides the pressure required to press the smoothing gear wheels against the gear wheel to be smoothed. As it is rotating, the gear wheel to be smoothed simultaneously performs an oscillating movement in the vertical direction, which is produced by the oscillating device with the drive motor 31 and the eccentrically supported shaft 32; this oscillation causes friction to develop between the teeth in the longitudinal direction. The gripping plunger 28 oscillating with the gear wheel is supported axially by a spring (not shown).

At the end of the smoothing process, the slide 17 is pulled back, and the gripping plunger 28 moves downward until it reaches a position between the gripper jaws 14 of the gripper 13, which takes back the smoothed gear wheel and carries it under further rotation of the rotating element 11 by 72° to a washing position in the washing station 4. There, a spray jet washes off the smoothing aid applied to the gear wheel during the smoothing operation. After the washing operation, the gear wheel is transported onward to the inspection station 5, where it arrives in a position above the mandrel 40. The lifting device lowers the rotating element 11, so that the gear wheel becomes seated on the mandrel 40. The gripper jaws 14 retract. Hydraulic fluid, forced into the ring-shaped space 41, expands the jacket ring 42 and this produces a friction-locking connection between the mandrel 40 and the gear wheel to be tested. The slide 34 is advanced until the testing gear wheel 35 engages with the gear wheel 39 to be tested. The gear wheel 39 to be tested, which is driven by the drive motor 36 via the shafts 37 and 38, generates noise as a result of its engagement with the freewheeling testing gear wheel 35. The frequency spectrum and loudness of this noise depend on the degree or smoothing, i.e., on the surface quality of the gear wheel 39 being tested. The noise sensor 49 records these noises and sends them to the sound analyzer 51. Comparison signals are stored in the sound analyzer 51, so that the analyzer can decide whether the gear wheel has been smoothed sufficiently or not.

If the degree of smoothing is sufficient, the gear wheel in question is transferred to the conveyor belt 8 at the unloading station 6 and carried away.

The installation of the noise sensor 49 on the yoke 44 and the attachment of the yoke to the sidepiece 45, which is connected to the sidepiece 47 by the joint 46 and a spring, make it possible for the noise generated by the gear wheels 35 and 39 to be sent to the analyzer 51 without falsification.

It is apparent that the processes described here on the basis of a single gear wheel passing through the system take place simultaneously at each of the various angular positions in which the five (or possibly more) grippers 13 are aligned with the stations 2–6. That is, a gear wheel is received, smoothed, washed, inspected, and discharged in each of these angular positions, for which purpose the lifting device lowers and raises the rotating element 11 again each time.

A relatively frequent special case occurs when the inspection station 5 determines that a gear wheel has not been smoothed sufficiently. In this case, the control unit mentioned above ensures that the gear wheel in question is not discharged at the unloading station 6 but rather sent back again through stations 3–5. A stopping device (not shown) installed a certain distance away from the loading station 2, ensures that the gear wheels do not become backed up at the loading station, when, as a result of the repeat passage of a gear wheel, a gear wheel already present at the loading station cannot be accepted. It is also possible for several gear wheels in succession to be identified as not having been smoothed sufficiently.

Whereas the washing station and the smoothing station are arranged on a common support table, the inspection station is isolated for the most part to avoid the transmission of structure-borne sound from the other stations of the device to the inspection station. The feet 53 of the inspection station could sit on rubber bearings or other vibration-damping elements even more effective at suppressing the transmission of sound.

In contrast to the exemplary embodiment described above, the washing station could be preceded by a centrifuge for removing the residues of the fluids used for smoothing.

The invention is not limited by the embodiments described above which are presented as examples only but can be modified in various ways within the scope of protection defined by the appended patent claims.

We claim:

1. A device for burnishing gear wheels, the device comprising
   a loading station for supplying gear wheels to the device,
   a burnishing station for burnishing tooth flanks of the gear wheels,
   an inspection station for inspecting a degree of burnishing of the gear wheels,
   an unloading station for carrying away processed gear wheels, wherein
   the loading station, the burnishing station, the inspection station and the unloading station are arranged around a rotary transport device for conveying the gear wheels from station to station, the rotary transport device including a rotating element that has gear wheel holders arranged over its circumference each with a gripper for grasping a gear wheel, the number of gear wheel holders corresponding to the number of stations, the rotary transport device being configured to be vertically displaceable in its entirety in a direction of a vertical rotary axis of the rotary transport device for simultaneously transferring the gear wheels to the stations or removing the gear wheels from the stations.

2. The device according to claim 1, further comprising a control means coupled to the inspection station for forwarding a processed gear wheel to the unloading station or for returning a processes gear wheel to the burnishing station.

3. The device according to claim 1, wherein the burnishing station is arranged following the loading station, the inspection station is arranged following the burnishing station and the unloading station is arranged following the inspection station.

4. The device according to claim 1, wherein the inspection station is arranged following the loading station, the burnishing station is arranged following the inspection station and the unloading station is arranged following the burnishing station.

5. The device according to claim 1, further comprising a washing station following the burnishing station for removing burnishing aids from the gear wheels.

6. The device according to claim 1, wherein the inspection station comprises a device for noise analysis.

7. The device according to claim 1, wherein the inspection station comprises at least one of mechanical measuring sensors or photosensors for effecting a geometric inspection of the gear wheels.

8. The device according to claim 1, further comprising an electrical control and evaluating device for effecting at least one of a single-flank contact rolling test, a two-flank contact rolling test, a conicity test and an inclination test of the gear wheel.

9. The device according to claim 8, wherein the contact rolling tests are effected by a noise analysis.

10. The device according to claim 1, further comprising means for acoustically separating the inspection station from the other stations.

11. The device according to claim 1, further comprising means for separating the inspection station from the other stations with respect to vibrations.

12. The device according to claim 1, wherein the burnishing station comprises burnishing wheels arranged so as to rotate about a vertical axis.

13. The device according to claim 1, wherein the gear wheel holders are configured to hold the gear wheels with the gear wheel axes extending in vertical direction.

14. The device according to claim 1, wherein an angular spacing between the gear wheel holders is constant.

15. The device according to claim 1, wherein the gear wheel holders are comprised of radially projecting gripping tongs.

16. The device according to claim 1, wherein the inspection station comprises a pneumatic mandrel for receiving a gear wheel to be inspected.

* * * * *